US009341248B2

(12) United States Patent
Wu

(10) Patent No.: US 9,341,248 B2
(45) Date of Patent: May 17, 2016

(54) LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 71 days.

(21) Appl. No.: 13/762,996

(22) Filed: Feb. 9, 2013

(65) Prior Publication Data
US 2014/0196555 A1    Jul. 17, 2014

(30) Foreign Application Priority Data

Jan. 17, 2013   (TW) .............................. 102105374 A

(51) Int. Cl.
*F16H 25/20*   (2006.01)
*F16C 29/00*   (2006.01)

(52) U.S. Cl.
CPC .............. *F16H 25/20* (2013.01); *F16C 29/005* (2013.01); *F16H 2025/204* (2013.01); *F16H 2025/209* (2013.01); *F16H 2025/2031* (2013.01); *F16H 2025/2084* (2013.01); *Y10T 74/18576* (2015.01)

(58) Field of Classification Search
CPC ............ F16H 25/20; F16H 2025/2031; F16H 2025/204; F16C 29/005
USPC ............... 74/89.23, 89.33, 89.34, 89.4, 89.41
See application file for complete search history.

(56) References Cited

U.S. PATENT DOCUMENTS

| 4,763,539 | A | * | 8/1988 | Kume ........................... 74/89.23 |
| 5,187,400 | A | * | 2/1993 | Kurata ........................ 310/49.12 |
| 5,355,287 | A | * | 10/1994 | Denley ........................... 362/524 |
| 5,747,896 | A | * | 5/1998 | Nagai et al. ..................... 310/20 |

(Continued)

FOREIGN PATENT DOCUMENTS

| CN | 100425873 C | 10/2008 |
| DE | 20108885 U1 | 10/2002 |

(Continued)

OTHER PUBLICATIONS

Combined search and examination report issued by Intellectual Property Office on Oct. 3, 2013.

(Continued)

*Primary Examiner* — William Kelleher
*Assistant Examiner* — Gregory Prather
(74) *Attorney, Agent, or Firm* — Chun-Ming Shih; HDLS IPR Services

(57) ABSTRACT

A linear actuator includes a driver (1), a transmission rod assembly (2), a mechanical motion conversion assembly (3) linked between the driver (1) and the transmission rod assembly (2), and a housing (4) covered onto the driver (1), the transmission rod assembly (2), and the mechanical motion conversion assembly (3). The housing (4) includes a lower part (40) and an upper part (41), and the lower part (40) sequentially includes a first containing portion (400) for receiving and installing the driver (1), a second containing portion (401) for receiving and installing the mechanical motion conversion assembly (3), and a third containing portion (402) for receiving and installing the transmission rod assembly (2), and the upper part (41) is covered on top of the first and second containing portions (401, 402), and the first, second and third containing portions (401, 402, 403) are integrally formed as a whole.

14 Claims, 8 Drawing Sheets

(56) References Cited

U.S. PATENT DOCUMENTS

| | | | |
|---|---|---|---|
| 5,749,266 A * | 5/1998 | Tsukada | 74/89.44 |
| 5,799,543 A * | 9/1998 | Nagai et al. | 74/490.09 |
| 5,895,992 A * | 4/1999 | Dreher | 310/80 |
| 6,019,513 A * | 2/2000 | Tsukada et al. | 384/15 |
| 6,109,124 A | 8/2000 | Chen | |
| 6,178,837 B1 * | 1/2001 | Nagai et al. | 74/89.23 |
| 6,240,796 B1 * | 6/2001 | Yamada | 74/89.23 |
| 6,346,788 B1 * | 2/2002 | Nagai et al. | 318/432 |
| 6,952,976 B2 | 10/2005 | Roither et al. | |
| 7,137,489 B2 * | 11/2006 | Bastholm et al. | 188/156 |
| 7,448,134 B2 * | 11/2008 | Nagai et al. | 29/898.03 |
| 7,538,466 B2 * | 5/2009 | Chang et al. | 310/112 |
| 7,628,087 B2 * | 12/2009 | Gerbier et al. | 74/89.23 |
| 7,891,265 B2 | 2/2011 | Erikson et al. | 74/441 |
| 7,926,371 B2 * | 4/2011 | Nielsen | 74/89.32 |
| 8,001,861 B2 * | 8/2011 | Fisher et al. | 74/89.36 |
| 8,278,793 B2 * | 10/2012 | Newberg et al. | 310/91 |
| 2002/0144561 A1 * | 10/2002 | Nagai et al. | 74/89.33 |
| 2006/0213297 A1 * | 9/2006 | Blum | 74/89.23 |
| 2008/0245165 A1 | 10/2008 | Wang | |
| 2009/0165581 A1 * | 7/2009 | Koyagi et al. | 74/89.23 |
| 2011/0234021 A1 * | 9/2011 | Eckstein et al. | 310/12.31 |
| 2012/0297908 A1 * | 11/2012 | Bourgoine et al. | 74/89.23 |
| 2012/0304788 A1 * | 12/2012 | Morgan et al. | 74/89.42 |
| 2012/0325033 A1 * | 12/2012 | Bosecker et al. | 74/89.23 |

FOREIGN PATENT DOCUMENTS

| | | |
|---|---|---|
| DE | 202005018433 U1 | 3/2006 |
| DE | 202006018505 U1 | 4/2008 |
| EP | 1400726 A1 | 3/2004 |
| EP | 1548327 A1 | 6/2005 |
| JP | 11051144 A | 2/1999 |
| JP | 2000136865 A | 5/2000 |
| JP | 2001141018 A | 5/2001 |
| JP | 2006223043 A | 8/2006 |
| JP | 2008099550 A | 4/2008 |
| JP | 2011117551 A | 6/2011 |

OTHER PUBLICATIONS

Office Action dated Dec. 24, 2015 of the corresponding China patent application.

* cited by examiner

LINEAR ACTUATOR

FIELD OF THE INVENTION

The present invention relates to a driving device, and more particularly to an improved linear actuator capable of converting a rotation motion into a linear motion.

BACKGROUND OF THE INVENTION

In general, a conventional linear actuator comprises a driver, a transmission rod assembly, a worm shaft and a worm gear that link the driver and the transmission rod assembly, and a housing that covers the aforementioned components. To facilitate installation, most housings adopt an assembly with a plurality of components, particularly the transmission rod assembly which is generally assembled by left and right halves. As a result, the thickness of the housing is increased, thus failing to meet the requirements of a thin design, making the assembling process relatively more difficult in the limited space, and occupying unnecessary space or volume. Furthermore, the housing having a plurality of components requires more molds for the manufacture and incurs a higher manufacturing cost and a more complicated assembling process.

In view of the foregoing problems, the inventor of the present invention based on years of experience in the related industry to conduct extensive researches and experiments to develop a linear actuator to overcome the problems of the prior art.

SUMMARY OF THE INVENTION

Therefore, it is a primary objective of the present invention to provide a linear actuator having a simple design of a housing, wherein the housing of the linear actuator has a small thickness and requires less components to achieve the effects of lowering the manufacturing cost and simplifying the assembling process.

Another objective of the present invention is to provide a linear actuator capable of reducing the volume by omitting the shell of a motor, and the corresponding housing can be fixed to stator and rotor shafts of the motor directly while further reducing the quantity of components, lowering the cost, and simplifying the assembling process.

A further objective of the present invention is to provide a linear actuator with the housing made of plastic, so that the linear actuator can have appropriate flexibility and deformability when the linear actuator is used for supporting a chair.

To achieve the aforementioned objective, the present invention provides a linear actuator comprising: a driver; a transmission rod assembly; a mechanical motion conversion assembly, linked between the driver and the transmission rod assembly; and a housing, covered onto the driver, the transmission rod assembly, and the mechanical motion conversion assembly, and including a lower part and an upper part, and the lower part sequentially including a first containing portion for receiving and installing the driver, a second containing portion for receiving and installing the mechanical motion conversion assembly, and a third containing portion for receiving and installing the transmission rod assembly, and the upper part being covered onto the first and second containing portions, and the first, second and third containing portions being integrally formed as a whole.

To achieve the other objective, the present invention provides a linear actuator, wherein the driver is a shell-less motor, so that the first containing portion of the upper part and the lower part of the housing can abut against the driver directly to reduce the space occupied by the upper part and the first containing portion.

To achieve the further objective, the present invention provides a linear actuator with the housing made of a flexible material such as plastic.

DESCRIPTION OF THE PREFERRED EMBODIMENTS

Figure 1:
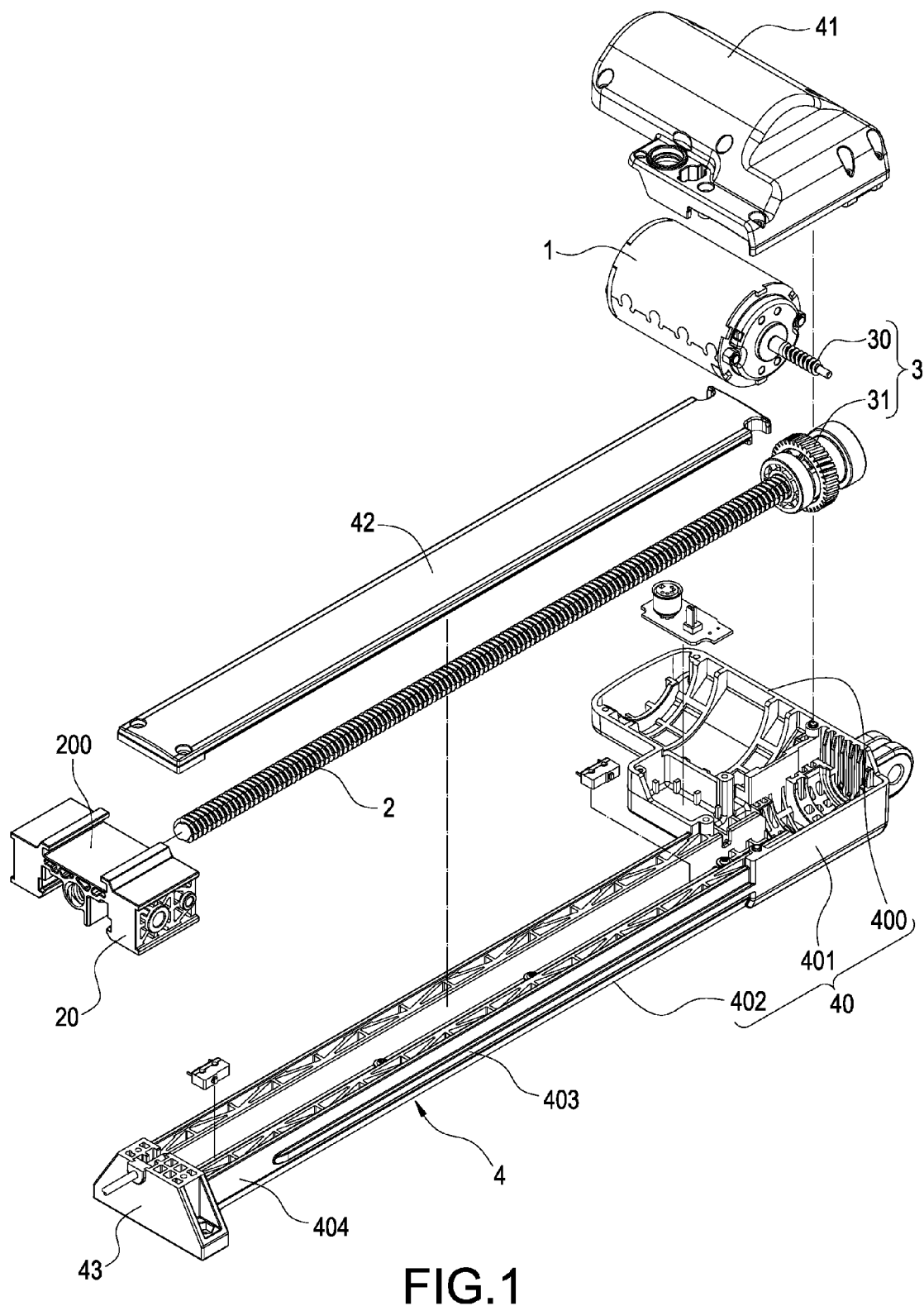
FIG. 1 is an exploded view of the present invention.

The technical contents of the present invention will become apparent with the detailed description of preferred embodiments accompanied with the illustration of related drawings as follows. It is noteworthy that same numerals are used for representing same respective elements in the drawings.

Figure 2:
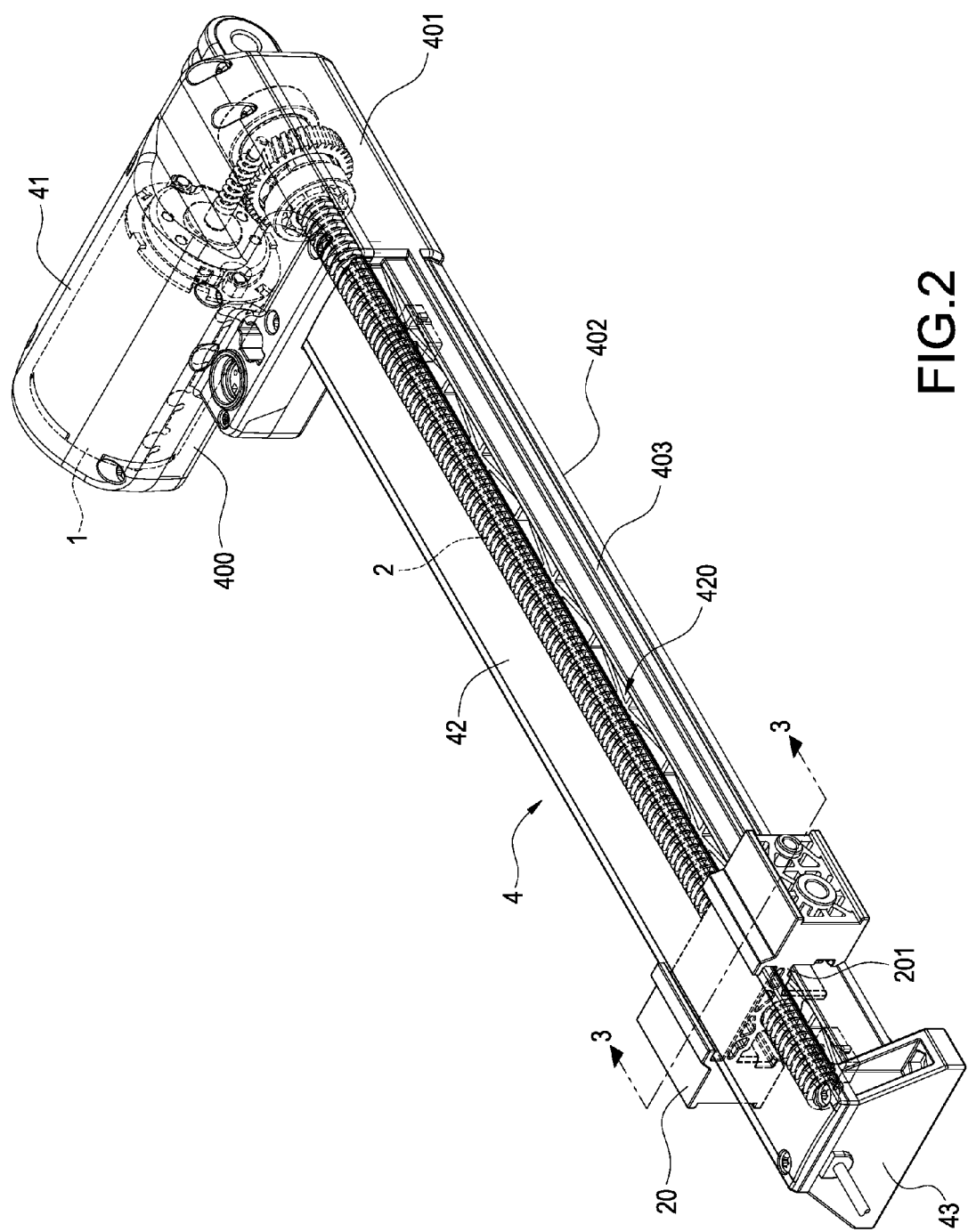
FIG. 2 is a perspective view of the present invention.

With reference to FIGS. 1 and 2 for an exploded view and a perspective view of a linear actuator of the present invention respectively, the linear actuator comprises a driver 1, a transmission rod assembly 2, a mechanical motion conversion assembly 3 for linking the driver 1 and the transmission rod assembly 2, and a housing 4 for covering the aforementioned components.

The driver 1 is a motor used as a power source, and the transmission rod assembly 2 is comprised of a screw rod. The mechanical motion conversion assembly 3 is coupled between the driver 1 and the transmission rod assembly 2 for converting a rotation motion provided by the driver 1 into a linear motion and then transmitting the linear motion to the transmission rod assembly 2 for a linear transmission. The mechanical motion conversion assembly 3 is comprised of a worm shaft 30 and a worm gear 31 installed at a transmission end of the driver 1 and an end of the transmission rod assembly 2 respectively. Since these parts are the same as the conventional ones and not intended to be covered by the claims of the present invention, therefore they are not described in details.

The present invention is mainly used on the housing 4 for covering the aforementioned components, and the housing 4 is made of a flexible material such as plastic and comprised of a lower part 40 and an upper part 41, wherein the lower part 40 sequentially includes a first containing portion 400 for receiving and installing the driver 1, a second containing portion 401 for receiving and installing the mechanical motion conversion assembly 3, and a third containing portion 402 for receiving and installing the transmission rod assembly 2, and the first, second and third containing portions 400, 401, 402 are integrally formed as a whole. The upper part 41 is disposed on the first and second containing portions 400, 401 and covered onto the driver 1 and the mechanical motion conversion assembly 3 to form the housing 4, wherein the housing 4 further includes a cover 42 disposed on the third containing portion 402 and covered onto the transmission rod assembly 2, and the cover 42 is integrally formed with the upper part 41. In addition, a holder 43 is further installed at an end of the third containing portion 402 of the lower part 40 of the housing 4 and provided for passing a locking element such as a bolt (not shown in the figure) to secure the holder at an appropriate position for the purpose of positioning or installation.

Figure 3:
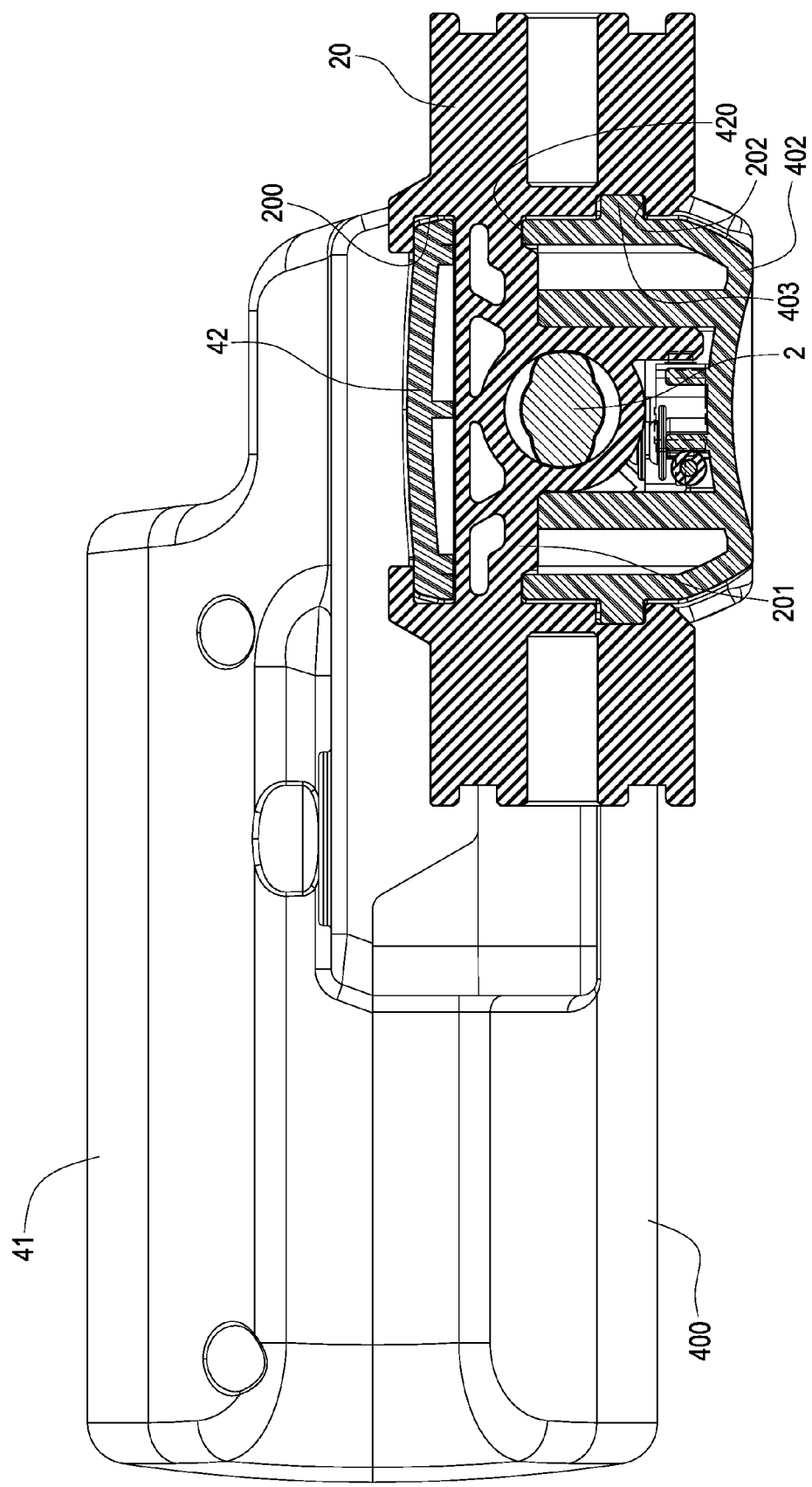
FIG. 3 is a cross-sectional view of Section 3-3 of FIG. 2.

With reference to FIG. 3, the lower part 40 of the housing 4 together with the opposite positions of the driver 1 and the transmission rod assembly 2 constitute the first, second and third containing portions 400, 401, 402, and the lower part 40 together with the driver 1 and the transmission rod assembly 2 form an L-shape to facilitate horizontal setting and installation of the driver 1, the transmission rod assembly 2 and the mechanical motion conversion assembly 3, such that the assembly formed by the lower part 40 and the upper part 41 or the cover 42 can be disposed in a horizontal position without increasing the thickness of the housing 4 in the longitudinal direction, so as to meet the thin design requirement.

Figure 4:
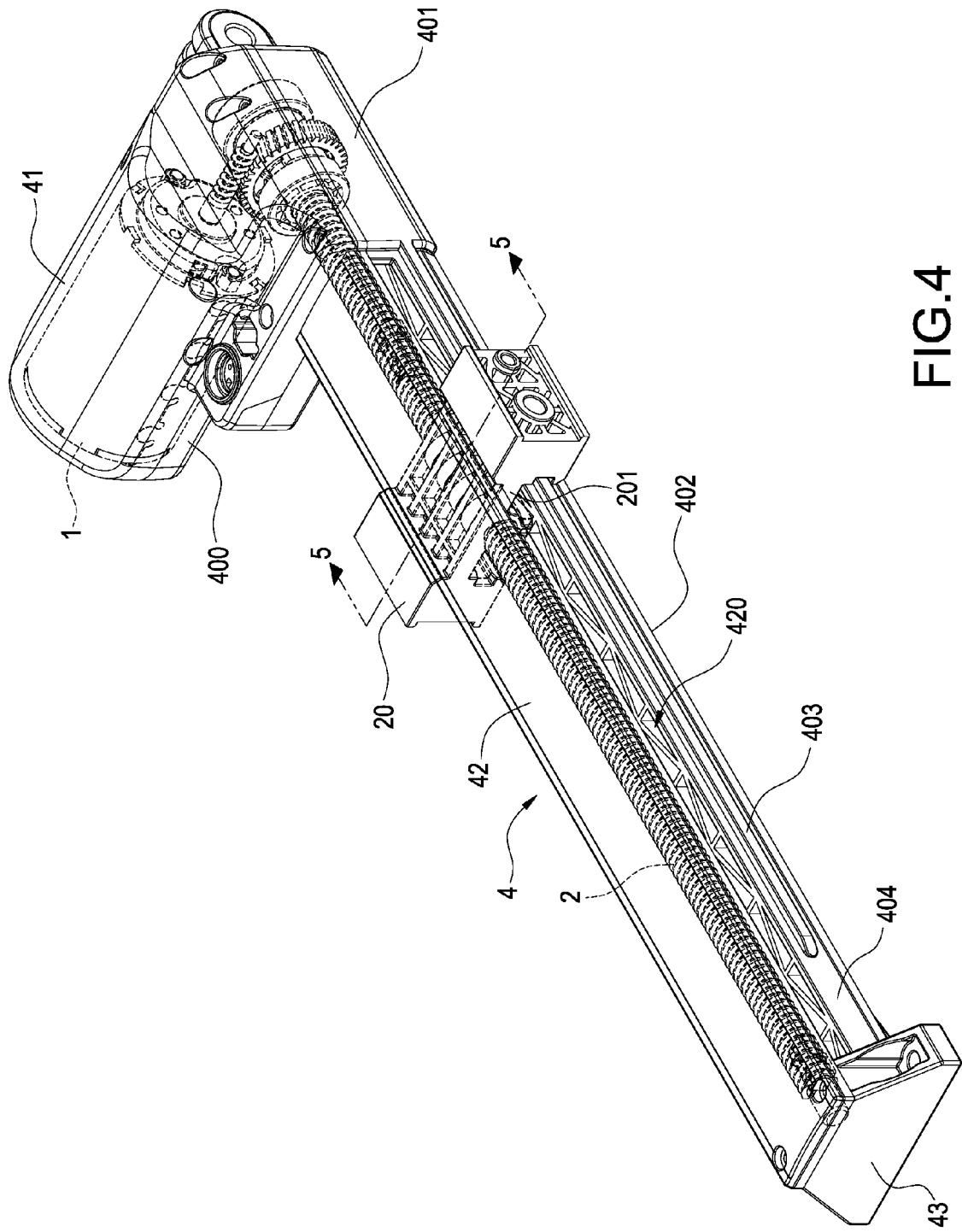
FIG. 4 is a perspective view of another preferred embodiment of the present invention.
Figure 5:
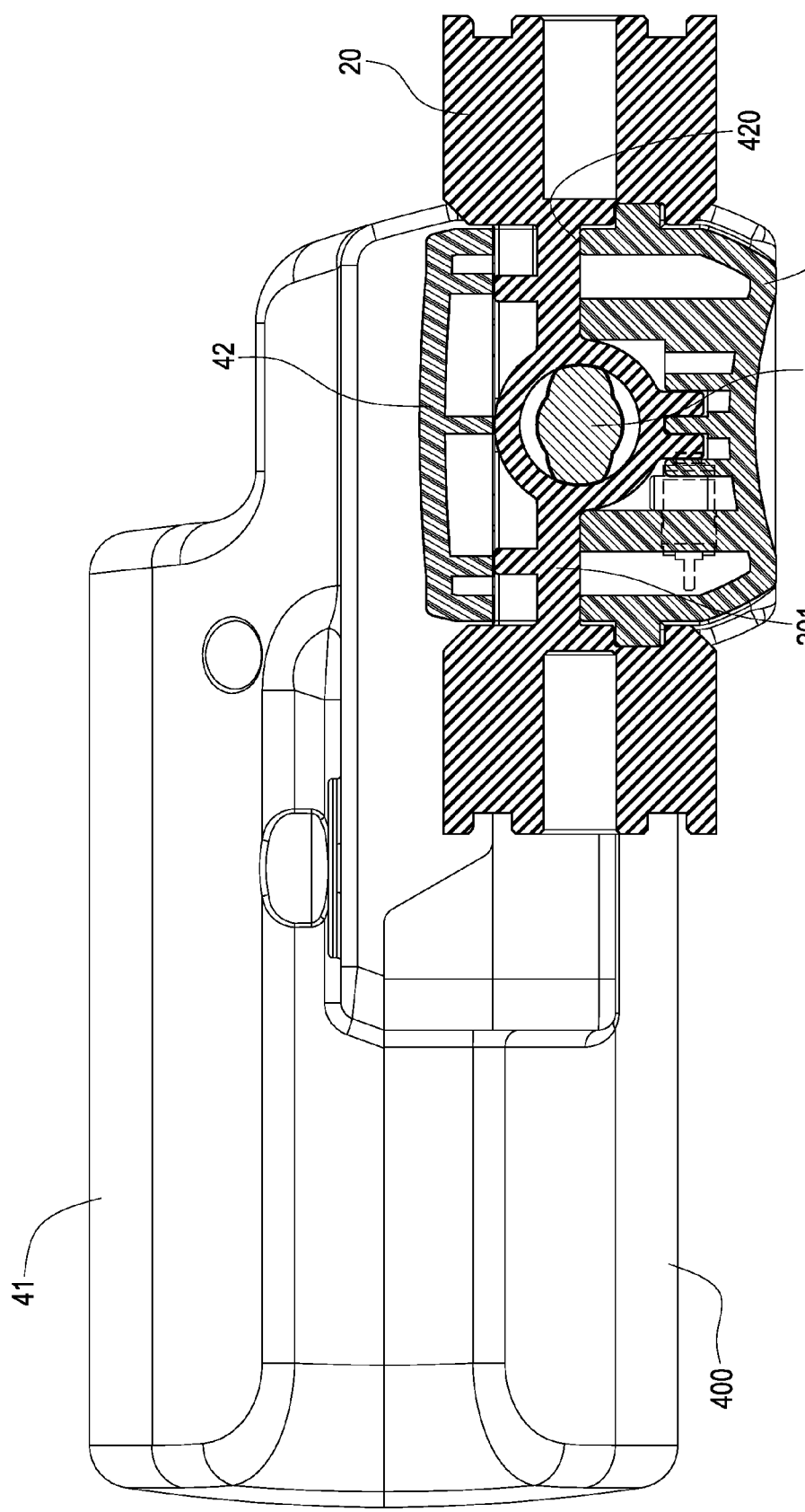
FIG. 5 is a cross-sectional view of Section 5-5 of FIG. 4.

In a preferred embodiments of the present invention, the transmission rod assembly 2 further drives a transmission part 20 to perform a linear transmission, and the transmission part 20 has a groove rail 200 disposed thereon, and the cover 42 and the groove rail 200 can slide with respect to each other, such that the transmission part 20 can slide on the groove rail 200. A guide space 420 is formed between the cover 42 and the third containing portion 402 and provided for the linear displacement of the transmission part 20, and the transmission part 20 has a slide portion 201 corresponding to the guide space 420. In FIGS. 1 and 2, a guide rail 403 is extended from an external side of the third containing portion 402 in the lengthwise direction, and a notch section 404 is formed at an end of the guide rail 403 for receiving the transmission part 20 from the notch section 404 and latching the guide rail 403 in the embedded groove 202 below the transmission part 20 (as shown in FIG. 3) in order to enhance the linear relation between the transmission part 20 and the third containing portion 402 and achieve the effect of stabilizing the linear motion. In this preferred embodiment, the groove rail 200 is a dovetail groove. In another preferred embodiment of the present invention as shown in FIGS. 4 and 5, the groove rail 200 is a U-shaped groove.

Figure 6:
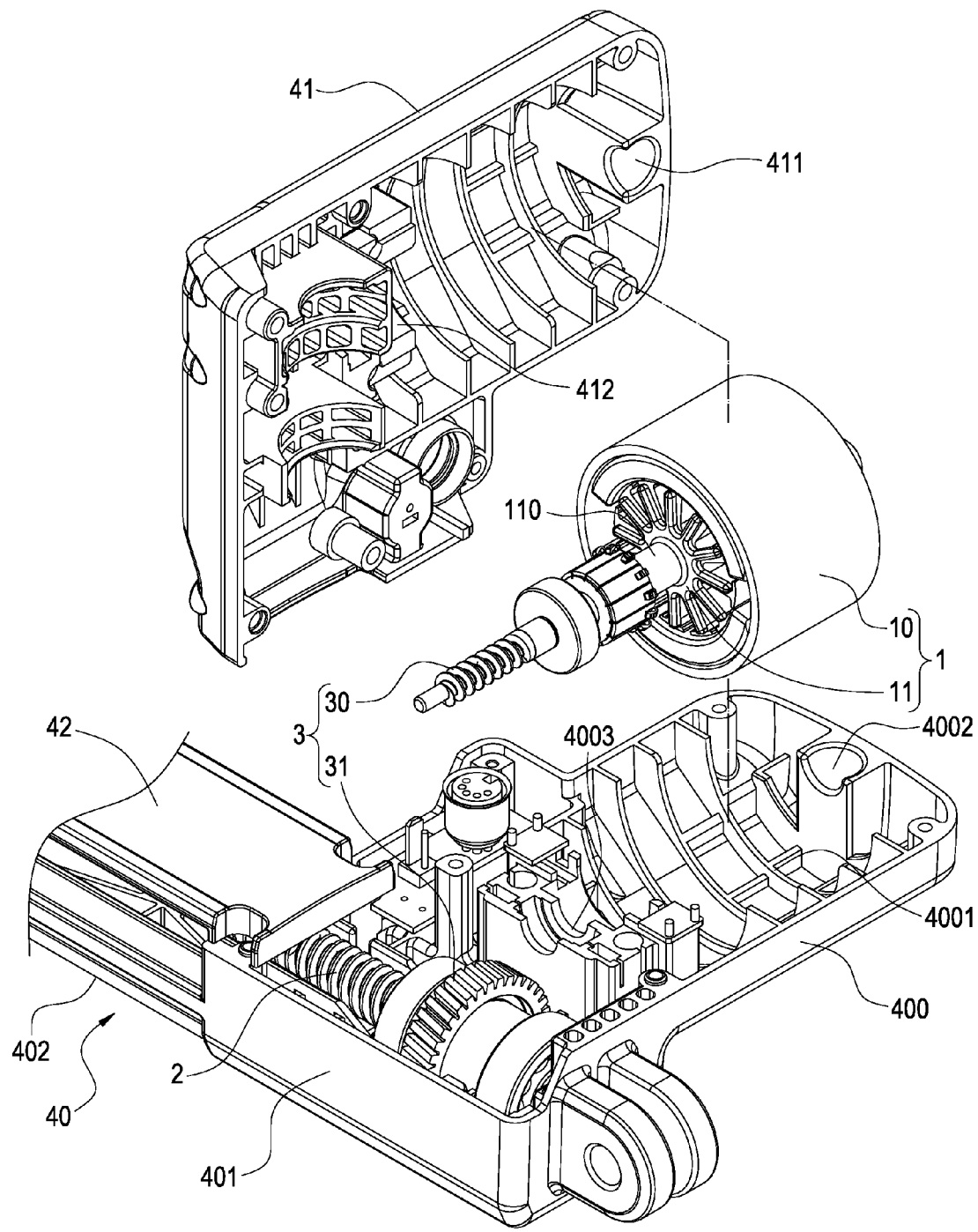
FIG. 6 is a partial exploded view of a further preferred embodiment of the present invention.
Figure 7:
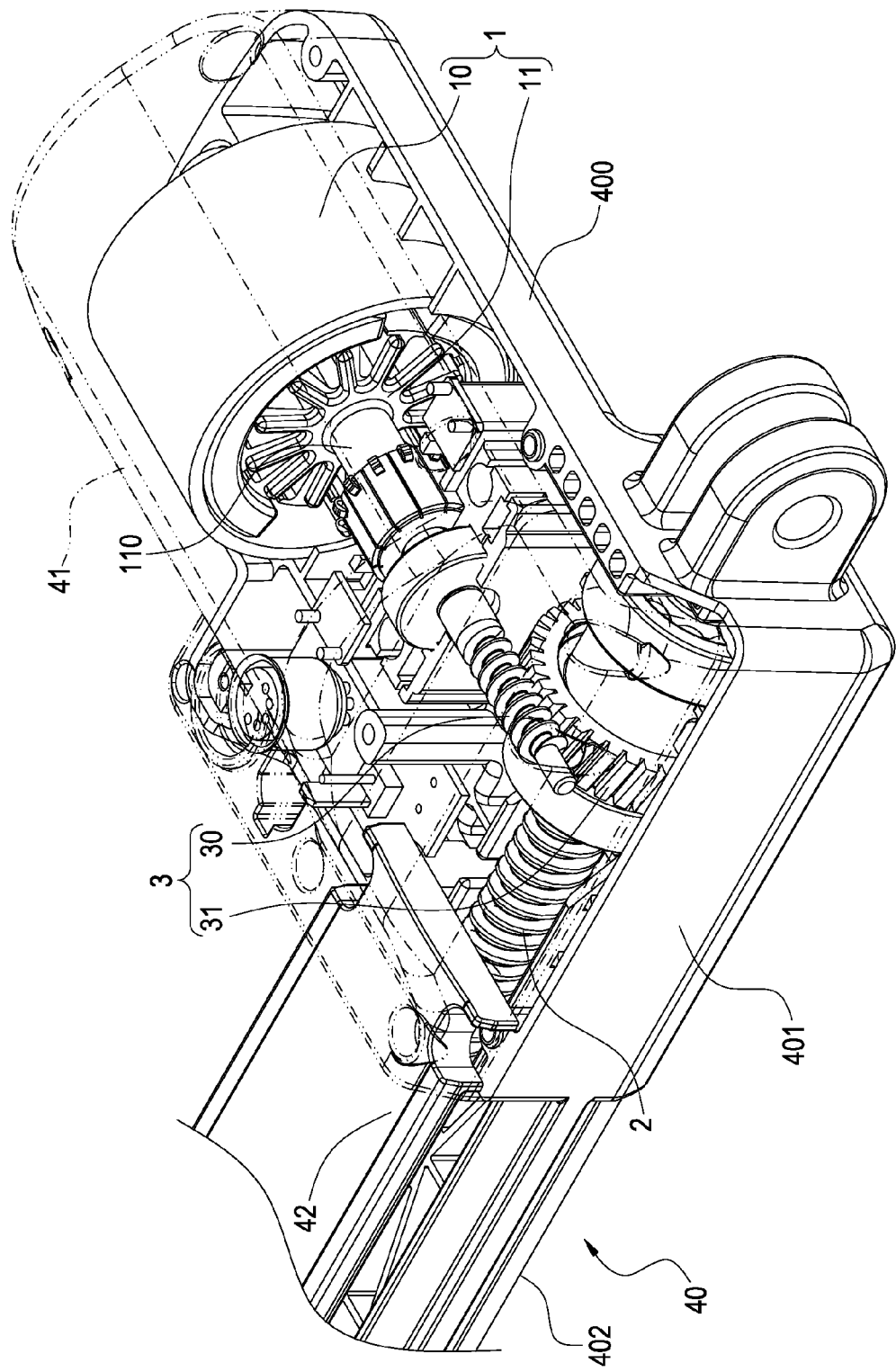
FIG. 7 is a partial perspective view of a further preferred embodiment of the present invention.
Figure 8:
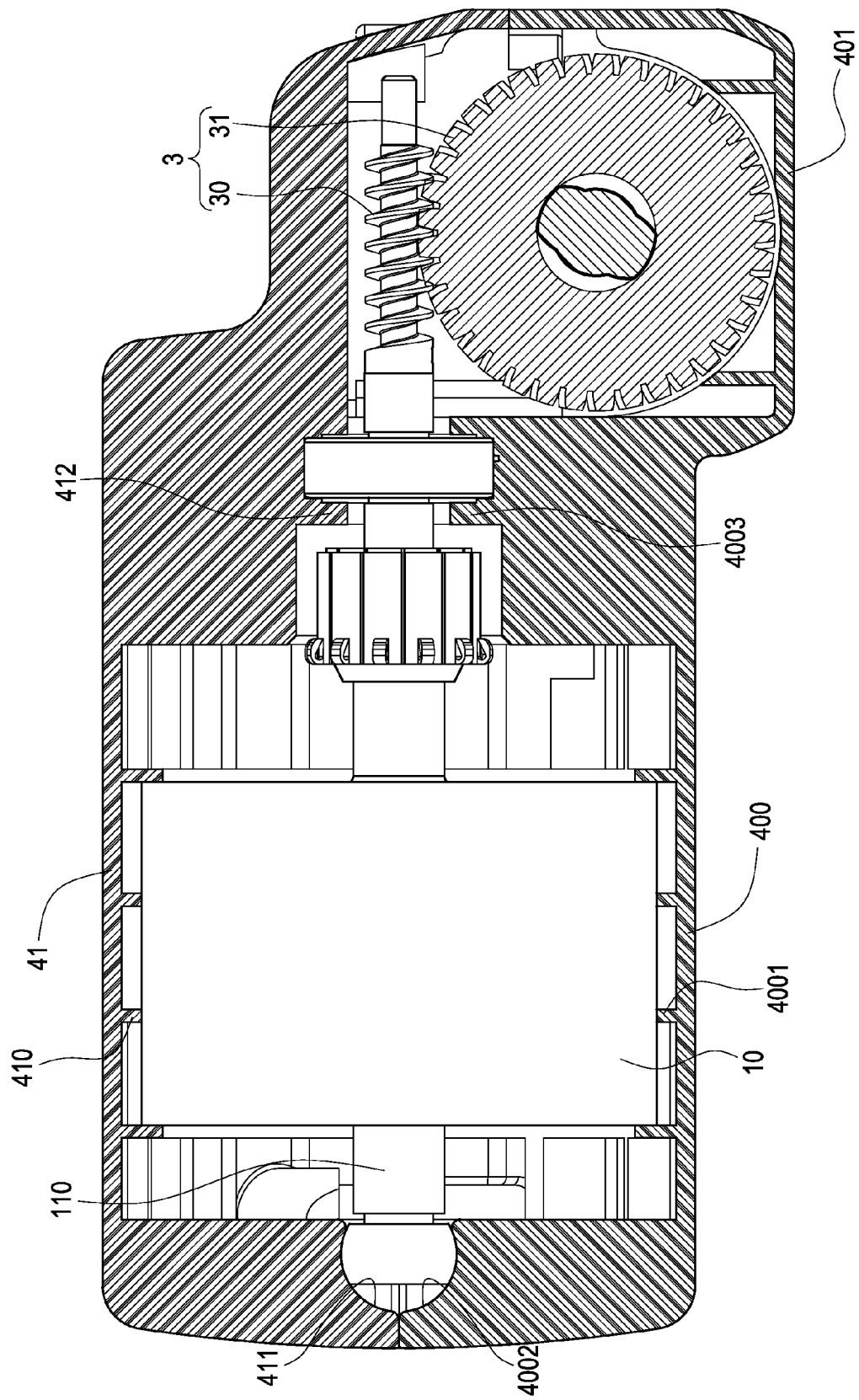
FIG. 8 is a cross-sectional view of a further preferred embodiment of the present invention.

In a further preferred embodiment of the present invention as shown in FIGS. 6 to 8, the driver 1 is a shell-less motor comprised of a stator 10 and a rotor 11, and an external wall of the first containing portion 400 of the upper part 41 and the lower part 40 is provided for limiting and positioning the stator 10 and the rotor 11, such that the volume of the upper part 41 and the first containing portion 400 can be reduced under the condition of the housing of the driver 1 being omitted. In this preferred embodiment, the upper part 41 has a plurality of upper ribs 410 protruded from an external wall of the upper part 41 and arranged with an interval apart from one another for abutting against an external wall of the corresponding stator 10, and a plurality of lower ribs 4001 protruded from an internal wall of the first containing portion 400 and arranged with an interval apart from one another for abutting against an external wall of the corresponding stator 10. Through the upper and lower ribs 410, 4001, the upper part 41 and the first containing portion 400 can be pressed tightly at the stator 10 for the positioning or limiting purpose. In addition, the rotor 11 has a rotor shaft 110 installed thereon, and the upper part 41 has an upper shaft socket 411 concavely formed at a rear side of the upper part 41, and the first containing portion 400 has a lower shaft socket 4002 concavely formed at a rear side of the first containing portion 400, and the upper and lower shaft sockets 411, 4002 are provided for holding and supporting ends of the rotor shaft 110 respectively. In the meantime, the upper part 41 has an upper shaft seat 412 formed at a front side of the upper part 41, and the first containing portion 400 has a lower shaft seat 4003 formed at a front side of the first containing portion 400, and the upper and lower shaft seats 412, 4003 are provided for pivotally coupling a front end of the rotor shaft 110. If the housing of the driver 1 is omitted, the upper part 41 and the first containing portion 400 of the housing 4 can position and limit the stator 10 and the rotor shaft 110 of the driver 1 to facilitate reducing the volume of the housing 4 in order to achieve the effects of reducing the quantity of components, lowering the cost, and simplifying the assembling process. The aforementioned structural assembly constitutes the linear actuator of the present invention.

In summation of the description above, the present invention achieves the expected objectives and overcomes the drawbacks of the prior art, and the invention complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A linear actuator, comprising:
   a driver (1);
   a transmission rod assembly (2);
   a mechanical motion conversion assembly (3), linked between the driver (1) and the transmission rod assembly (2);
   a housing (4), covered onto the driver (1), the transmission rod assembly (2), and the mechanical motion conversion assembly (3), and including a lower part (40), an upper part (41), and a cover (42); the lower part (40) sequentially including a first containing portion (400) for receiving and installing the driver (1), a second containing portion (401) for receiving and installing the mechanical motion conversion assembly (3), and a third containing portion (402) for receiving and installing the transmission rod assembly (2), and the upper part (41) being covered onto the first and second containing portions (400, 401), and the first, second and third containing portions (400, 401, 402) being integrally formed as a whole; and
   a transmission part (20) having an exterior top surface and an open bottom part, and a groove rail (200) being protruded outwardly from the exterior top surface,
   wherein the cover (42) is slidably accommodated into the groove rail (200) on the exterior top surface of the transmission part (20) and covers the third containing portion (402),
   wherein a guide space (420) is formed between the cover (42) and the third containing portion (402) and provided for the linear displacement of the transmission part (20), and the transmission part (20) has a slide portion (201) corresponding to the guide space (420) to be located between the cover (42) and the third containing portion (402),
   wherein the third containing portion (402) has a guide rail (403) extended from the second containing portion (401) and formed on an external surface of the third containing portion (402) in a lengthwise direction, and a notch section (404) located at an open end of the third containing portion (402) without forming the guide rail (403) so that the transmission part (20) is capable of being received from the notch section (404) and latching the guide rail (403) in an embedded groove (202) formed in the open bottom part of the transmission part (20).

2. The linear actuator of claim 1, wherein the driver (1) is a motor.

3. The linear actuator of claim 1, wherein the transmission rod assembly (2) is a screw rod.

4. The linear actuator of claim 3, wherein the mechanical motion conversion assembly (3) is comprised of a worm shaft (30) and a worm gear (31).

5. The linear actuator of claim 1, wherein the transmission rod assembly (2) further drives the transmission part (20) to perform a linear transmission.

6. The linear actuator of claim 1, wherein the groove rail (200) is a dovetail groove or a U-shaped groove.

7. The linear actuator of claim 1, wherein the lower part (40) of the housing (4) is L-shaped.

8. The linear actuator of claim 1, wherein the third containing portion (402) further has a holder (43) disposed at the open end of the third containing portion (402).

9. The linear actuator of claim 1, wherein the housing (4) is made of a flexible material.

10. The linear actuator of claim 9, wherein the flexible material is plastic.

11. The linear actuator of claim 1, wherein the driver (1) is a shell-less motor, and the upper part (41) and the first containing portion (400) abut the driver (1) directly.

12. The linear actuator of claim 11, wherein the driver (1) is comprised of a stator (10) and a rotor (11), and the rotor (11) has a rotor shaft (110), and the upper part (41) has a plurality of upper ribs (410) protruded from an inner wall of the upper part (41) and arranged with an interval apart from one another, and a plurality of lower ribs (4001) protruded from an inner wall of the first containing portion (400) and arranged with an interval apart from one another, and the upper and lower ribs (410, 4001) abut the stator (10).

13. The linear actuator of claim 12, wherein the upper part (41) has an upper shaft socket (411) concavely formed at a rear side of the upper part (41), and the first containing portion (400) has a lower shaft socket (4002) concavely formed at a rear side of the first containing portion (400), and the upper and lower shaft sockets (411, 4002) are provided for holding and supporting ends of the rotor shaft (110) respectively.

14. The linear actuator of claim 12, wherein the upper part (41) has an upper shaft seat (412) disposed on a front side of the upper part (41), and the first containing portion (400) has a lower shaft seat (4003) disposed on a front side of the first containing portion (400), and the upper and lower shaft (412, 4003) seats are provided for pivotally coupling ends of the rotor shaft (110) respectively.

* * * * *